United States Patent [19]

Suzuki

[11] Patent Number: 4,812,104
[45] Date of Patent: Mar. 14, 1989

[54] ELECTRICAL ROBOT

[75] Inventor: Hiroshi Suzuki, Yokohama, Japan

[73] Assignee: Tokico Ltd., Japan

[21] Appl. No.: 94,394

[22] Filed: Sep. 8, 1987

[30] Foreign Application Priority Data

Sep. 17, 1986 [JP] Japan .................. 61-218790

[51] Int. Cl.$^4$ .............................................. B25J 9/06
[52] U.S. Cl. .................................... 414/735; 414/719;
901/15; 901/21; 901/23; 901/48
[58] Field of Search ............... 414/735, 917, 744 R,
414/744 A, 719; 901/15, 29, 21, 23, 24, 43, 48

[56] References Cited

U.S. PATENT DOCUMENTS 4,586,868  5/1986  Nakashima et al. ............. 414/735
4,668,155  5/1987  Kaufmann et al. .......... 414/917 X

FOREIGN PATENT DOCUMENTS 12140  4/1986  Japan .

Primary Examiner—Robert J. Spar
Assistant Examiner—Donald W. Underwood
Attorney, Agent, or Firm—Andrus, Sceales, Starke & Sawall

[57] ABSTRACT

An electrical robot comprises motors for driving a wrist mechanism mounted on a tip end of an arm. The motors are provided at an intermediate portion of a support beam which is provided on a rotary base and supports the arm.

5 Claims, 8 Drawing Sheets

ELECTRICAL ROBOT

BACKGROUND OF THE INVENTION

The present invention generally relates to electrical robots, and more particularly to an electrical robot which carries out a predetermined operation when rotational driving forces of motors are transmitted thereto.

Generally, an articulated electrical robot for carrying out an operation such as a painting operation and a welding operation comprises a rotary base, a support beam, an arm, a wrist mechanism and the like. Each movable part of the electrical robot is driven by a rotational driving force of a motor, so that the electrical robot plays back a programmed operation.

One example of the conventional electrical robot of this type is disclosed in a Japanese Published Patent Application No. 61-12140. According to this conventional electrical robot, a motor for driving the support beam which is provided on the rotary base and is free to turn up and down, a motor for driving the arm which is supported on an upper end of the support beam, motors for driving the wrist mechanism which is mounted on a tip end of the arm and the like are respectively provided at low positions of the support beam in vicinities of the rotary base. In addition, each motor projects in a horizontal direction from the low position of the support beam. The motors for driving the wrist mechanism in particular are mounted on the rear of the other motors for driving the arm and the support beam.

Generally, various obstacles such as apparatuses are provided in the surroundings of a production line where the electrical robot is located, and an operation region in which the electrical robot can operate is often limited. However, since the motors project in the horizontal direction from the low positions in the vicinities of the rotary base, the motors, especially the motors which are provided on the rear of the other motors for driving the wrist mechanism, may move out of the operation region and hit the obstacles in the surroundings when the arm is turned by rotating the rotary base.

In order to prevent the motors for driving the wrist mechanism from hitting the obstacles in the surroundings, it is possible to conceive such an arrangement that these motors are mounted on a base portion of the arm. When the motors for driving the wrist mechanism are mounted on the arm, it is possible to prevent the motors from hitting the obstacles in the surroundings because the mounting positions of the motors become high. However, there are problems in that the weight of the arm increases and it becomes necessary to employ a large motor having a sufficient power to drive the arm. As a result, the operation characteristic of the arm becomes poor.

On the other hand, since each motor is provided at the low position of the support beam in order to prevent the operation characteristic of each part of the electrical robot from becoming deteriorated due to inertia of each part when it moves, a transmitting path between each motor and a corresponding part of the electrical robot driven thereby is relatively long. For this reason, there is also a problem in that the construction of particularly a transmitting mechanism for transmitting the rotational driving force of the motor for driving the wrist mechanism to the wrist mechanism becomes complex due to the relatively long transmitting path therebetween.

In addition, it is desirable that the motor part is located at such a position that the maintenance thereof is easy to carry out.

SUMMARY OF THE INVENTION

Accordingly, it is a general object of the present invention to provide a novel and useful electrical robot in which the problems described heretofore are eliminated.

Another and more specific object of the present invention is to provide an electrical robot in which motors for driving a wrist mechanism which is mounted on a distal end of an arm are provided at an intermediate portion of a support beam which is provided on a rotary base and supports the arm.

According to the electrical robot of the present invention, the mounting positions of the motors for driving the wrist mechanism are high compared to those of the conventional electrical robot wherein the motors are provided at the low positions of the support beam, for example, because the motors are provided at the intermediate portion of the support beam. In addition, it is possible to mount the motors so that the motors do not project greatly from the support beam. Hence, it is possible to prevent the motors from hitting obstacles in the surroundings when the arm is turned by rotating the rotary base. Moreover, the operation characteristic of the arm is not deteriorated and it is unnecessary to employ a large motor for driving the arm, since not all of the motors for driving the wrist mechanism are provided on the arm. Furthermore, the length of a transmitting path through which rotational driving forces of the motors are transmitted to the wrist mechanism is shorter than that of the conventional electrical robot, and the construction of a transmitting mechanism for transmitting the rotational driving forces of the motors to the wrist mechanism becomes simple.

Still another object of the present invention is to provide an electrical robot in which a motor for driving the arm is provided on an upper surface of the rotary base.

According to the electrical robot of the present invention, the maintenance of the motor part is facilitated.

Other objects and further features of the present invention will be apparent from the following detailed description when read in conjunction with the accompanying drawings.

BRIEF DESCRIPTION OF THE DRAWINGS

FIGS. 8 and 9 are perspective views respectively showing a second embodiment of the electrical robot according to the present invention.

DETAILED DESCRIPTION

Figure 1:
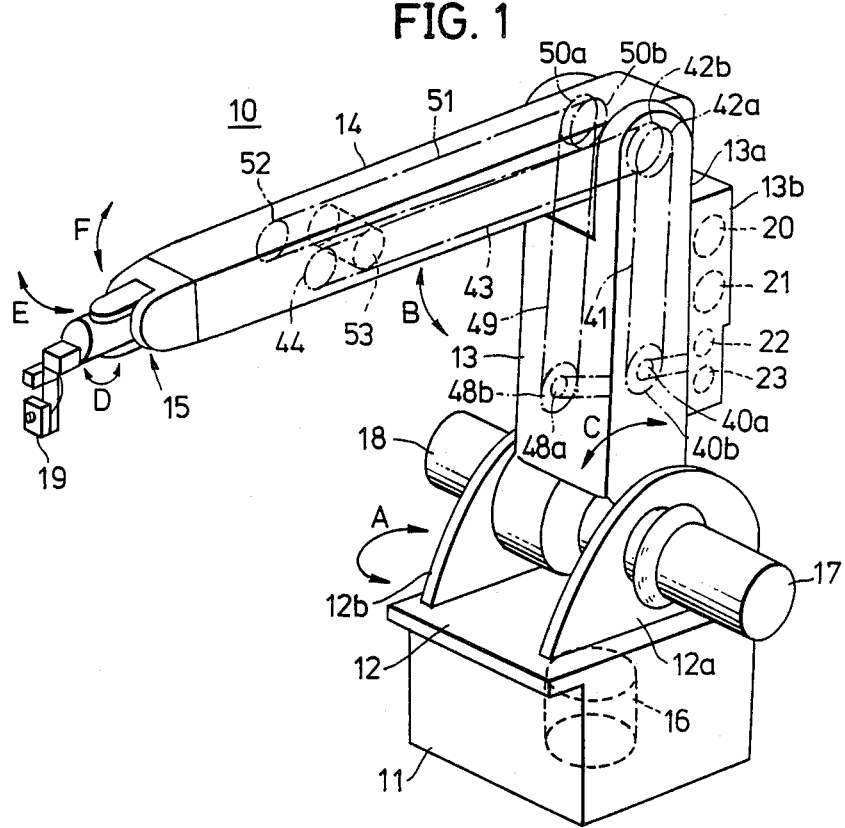
FIG. 1 is a perspective view showing a first embodiment of the electrical robot according to the present invention.
Figure 2:
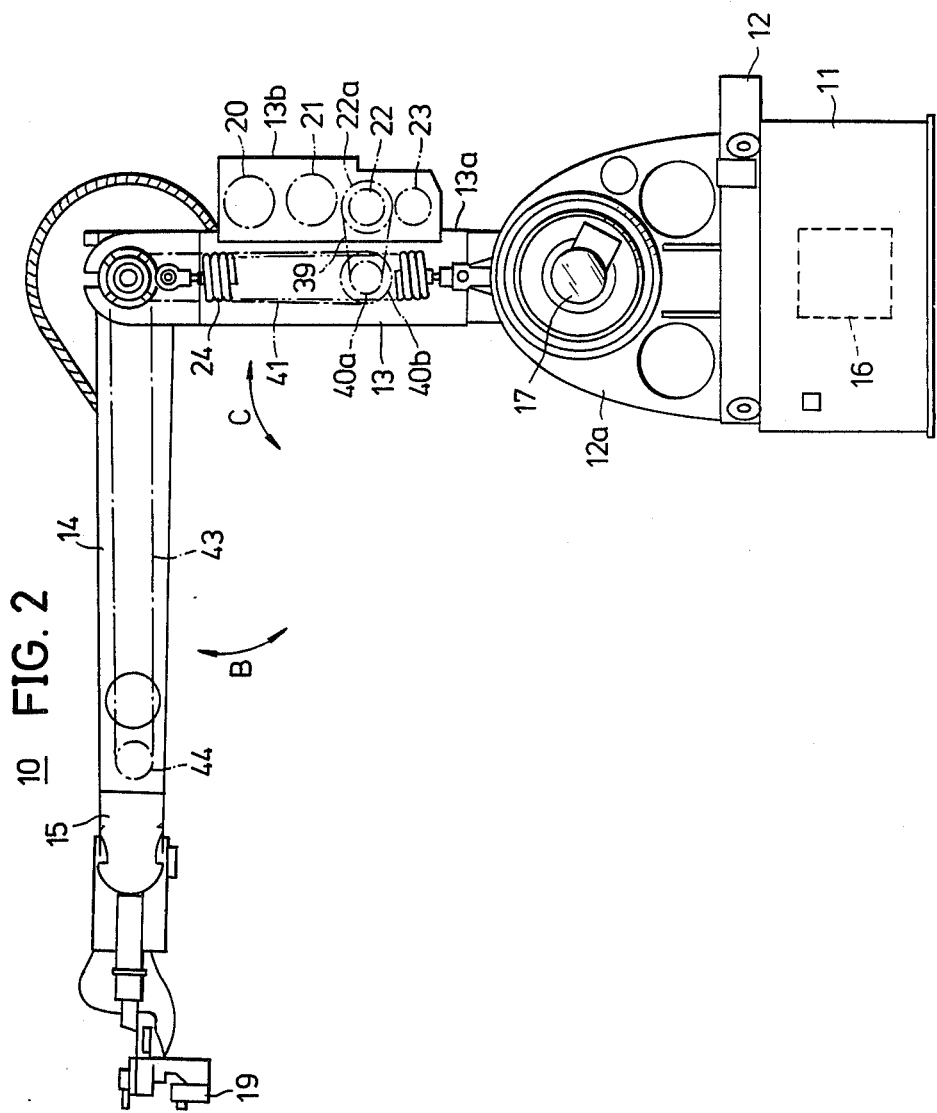
FIG. 2 is a side view of the electrical robot shown in FIG. 1.
Figure 3:
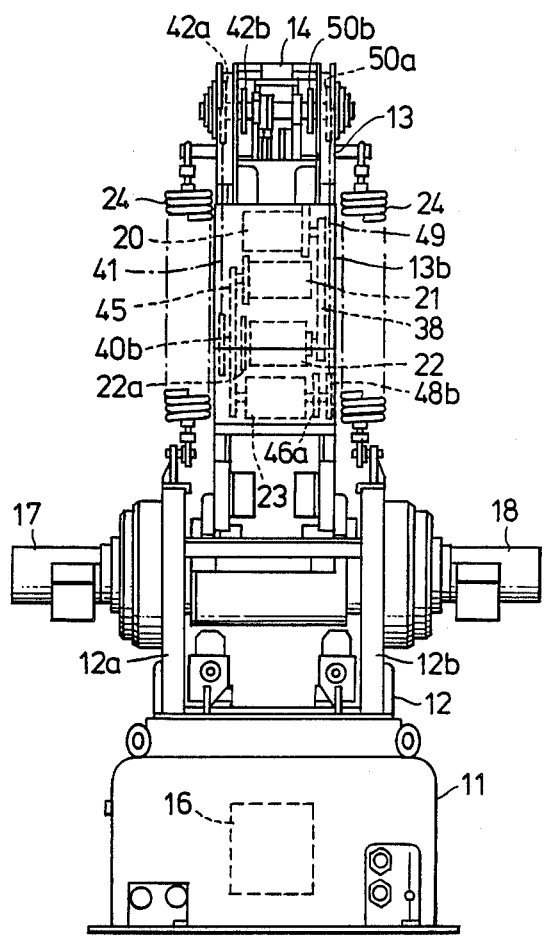
FIG. 3 is a rear view of the electrical robot shown in FIG. 1.

First, a description will be given on a first embodiment of the electrical robot according to the present invention. As shown in FIGS. 1 through 3, an articulated electrical robot 10 which is used to carry out a painting operation, for example, generally comprises a base 11, a rotary base 12 rotatably provided on the base 11, a support beam 13 provided on the rotary base 12 and free to turn up and down, an arm 14 rotatably supported on an upper end of the support beam 13, and a wrist mechanism 15 mounted on a distal end of the arm 14. The rotary base 12 is driven by a rotational driving force of a motor 16 provided within the base 11 and is rotated in a direction A.

The rotary base 12 comprises support brackets 12a and 12b which confront each other on an upper surface of the rotary base 12. A motor unit 17 for driving the arm 14 in a direction B is provided on the support bracket 12a, and a motor unit 18 for driving the support beam 13 in a direction C is provided on the support bracket 12b.

A spray gun 19 for painting is mounted on the wrist mechanism 15 as an example of a working tool. As will be described later on in the present specification, the wrist mechanism 15 is rotatable in directions D, E and F. Accordingly, the spray gun 19 has three degrees of freedom of motion.

Motors 20 and 21 for driving the wrist mechanism 15 through a transmitting mechanism which will be described later and harmonic drives (registered trademark) 22 and 23 which are used as reduction gears are provided on a rear part 13a of the support beam 13 at an intermediate portion of the support beam 13. The motors 20 and 21 and the harmonic drives 22 and 23 are arranged downwardly in this sequence, and are accommodated within a covering box 13b.

A pair of coil springs 24 are located on the respective sides of the support beam 13. Upper ends of the coil springs 24 are connected to the support beam 13, and lower ends of the coil springs 24 are respectively connected to the support brackets 12a and 12b. Tension is introduced in the coil springs 24 when the support beam 13 turns up and down, and the tension is used to balance and maintain the support beam 13 in a predetermined turned position.

The arm 14 is also balanced and maintained in a predetermined rotary position by the action of a balancing mechanism (not shown) which applies an urging force on the arm 14 through a link mechanism which will be described later.

Figure 4:
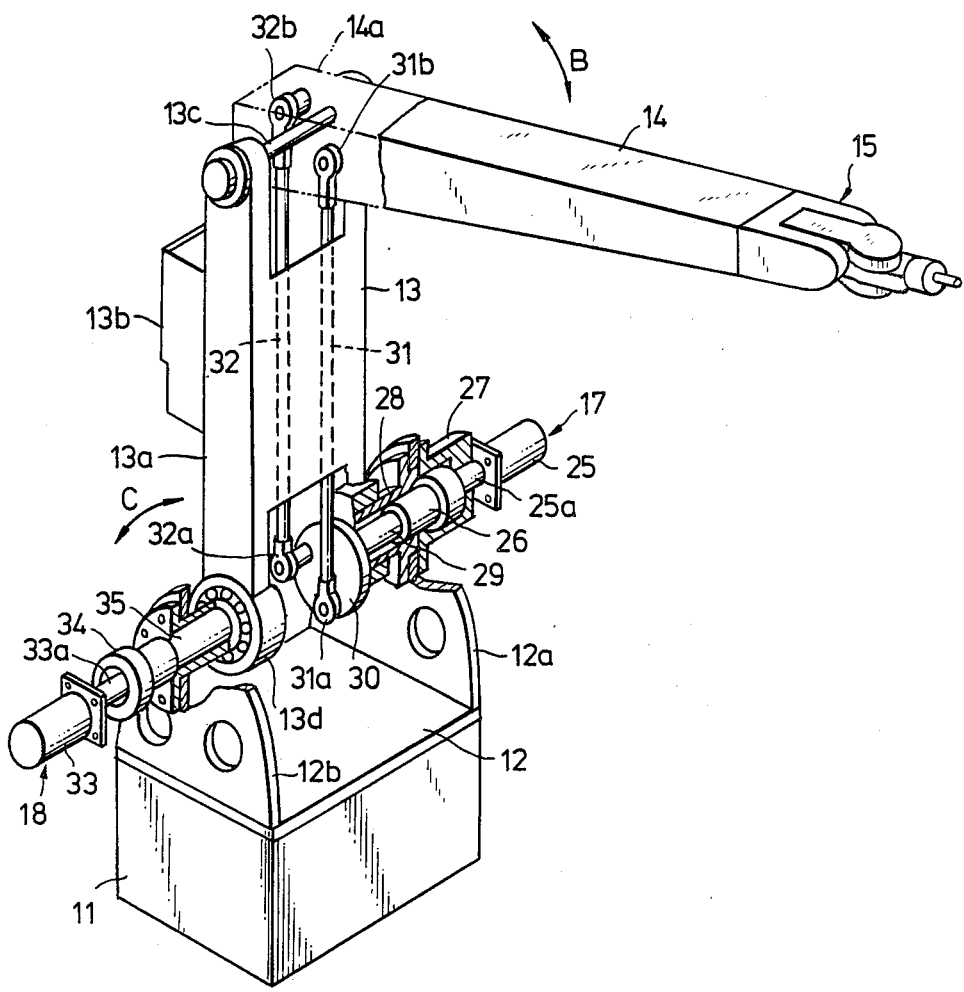
FIG. 4 is a perspective view showing mechanisms for operating a support beam and an arm.

As shown in FIG. 4, the motor unit 17 comprises a motor 25, a harmonic drive 26 for reducing the rotational driving force of the motor 25, and a covering box 27 for accommodating the harmonic drive 26. An output shaft 25a of the motor 25 is coupled through the harmonic drive 26 to a shaft 29 which penetrates a hollow cylindrical support member 28. This shaft 29 is provided unitarily with a link disc 30.

Links 31 and 32 indicated by phantom lines in FIG. 4 extend inside the support beam 13, and lower ends 31a and 32a of the links 31 and 32 are connected to the link disc 30. The lower ends 31a and 32a are connected to the link disc 30 with an angular separation of 90° on the link disc 30. Upper ends 31b and 32b of the links 31 and 32 are connected to a base portion 14a of the arm 14.

The rotational driving force of the motor 25 is transmitted to the link disc 30 after being reduced by the harmonic drive 26. For this reason, the rotation of the link disc 30 is transmitted to the arm 14 through the links 31 and 32, and the arm 14 is rotated up and down a predetermined angle in the direction B about a shaft 13c of the support beam 13.

The motor unit 18 comprises a motor 33, a harmonic drive 34, and a covering box (not shown) for accommodating the harmonic drive 34. An output shaft 33a of the motor 33 is coupled through the harmonic drive 34 to a shaft 35 which is coupled to a lower end 13d of the support beam 13.

The rotational driving force of the motor 33 is transmitted to the shaft 35 after being reduced by the harmonic drive 34. Accordingly, the support beam 13 turns in the direction C together with the shaft 35.

Figure 5:
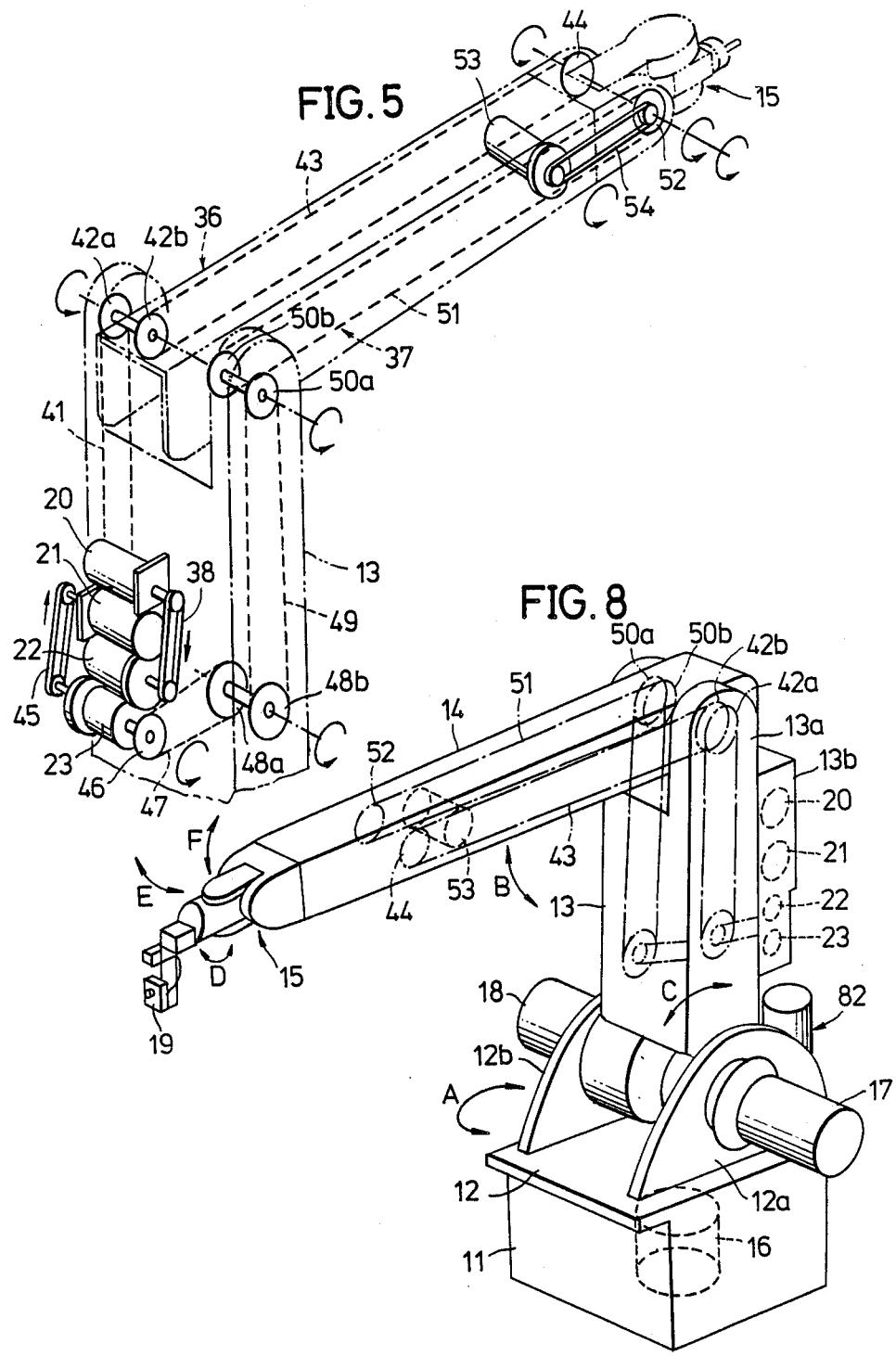
FIG. 5 is a perspective view showing a mechanism for driving a wrist mechanism.

As shown in FIG. 5, the rotational driving forces of the motors 20 and 21 are transmitted to the wrist mechanism 15 through respective transmitting mechanisms 36 and 37. In other words, in FIGS. 2, 3 and 5, the rotational driving force of the motor 20 is transmitted to the harmonic drive 22 through a timing belt 38 and reduced, and is thereafter transmitted to a sprocket 22a, a chain 39 and a sprocket 40a. The rotational driving force of the motor 20 is further transmitted to a sprocket 42a at the upper end of the support beam 13 through a sprocket 40b which rotates unitarily with the sprocket 40a and a chain 41 accommodated within the support beam 13. In addition, the rotational driving force of the motor 20 is further transmitted to a sprocket 44 at the tip end of the arm 14 through a sprocket 42b which rotates unitarily with the sprocket 42a and a chain 43. The transmitting mechanism 36 comprises the timing belt 38, the harmonic drive 22, the sprocket 22a, the chain 39, the sprockets 40a and 40b, the chain 41, the sprockets 42a and 42b, the chain 43 and the sprocket 44.

Similarly as in the case of the rotational driving force of the motor 20, the rotational driving force of the motor 21 is transmitted to a sprocket 52 at the tip end of the arm 14 through a timing belt 45, the harmonic drive 23, a sprocket 46, a chain 47, sprockets 48a and 48b, a chain 49, sprockets 50a and 50b and a chain 51. The transmitting mechanism 37 comprises the timing belt 45, the harmonic drive 23, the sprocket 46, the chain 47, the sprockets 48a and 48b, the chain 49, the sprockets 50a and 50b, the chain 51 and the sprocket 52.

In addition, a motor 53 for driving the wrist mechanism 15 is provided inside the arm 14. Accordingly, the wrist mechanism 15 is displaced in the directions D, E and F when the rotational driving forces of the motors 20, 21 and 53 are transmitted to the wrist mechanism 15, and the spray gun 19 is operated so as to carry out a predetermined painting operation.

The motors 20 and 21 and the harmonic drives 22 and 23 are mounted sideways on the rear part 13a of the support beam 13 and do not greatly project from the support beam 13. For this reason, the motors 20 and 21 will not hit obstacles in the surroundings of the electrical robot when the arm 14 is turned horizontally, for example.

On the other hand, because the motors 20 and 21 and the harmonic drives 22 and 23 are not provided on the arm 14, the inertia of the arm 14 when it moves substantially does not increase. Therefore, it is unnecessary to increase the capacity and size of the motor 25 for driving the arm 14 nor the capacity and size of the motor 33 for driving the support beam 13, and no deterioration is introduced in the operation characteristic of the arm 15.

Figure 6:
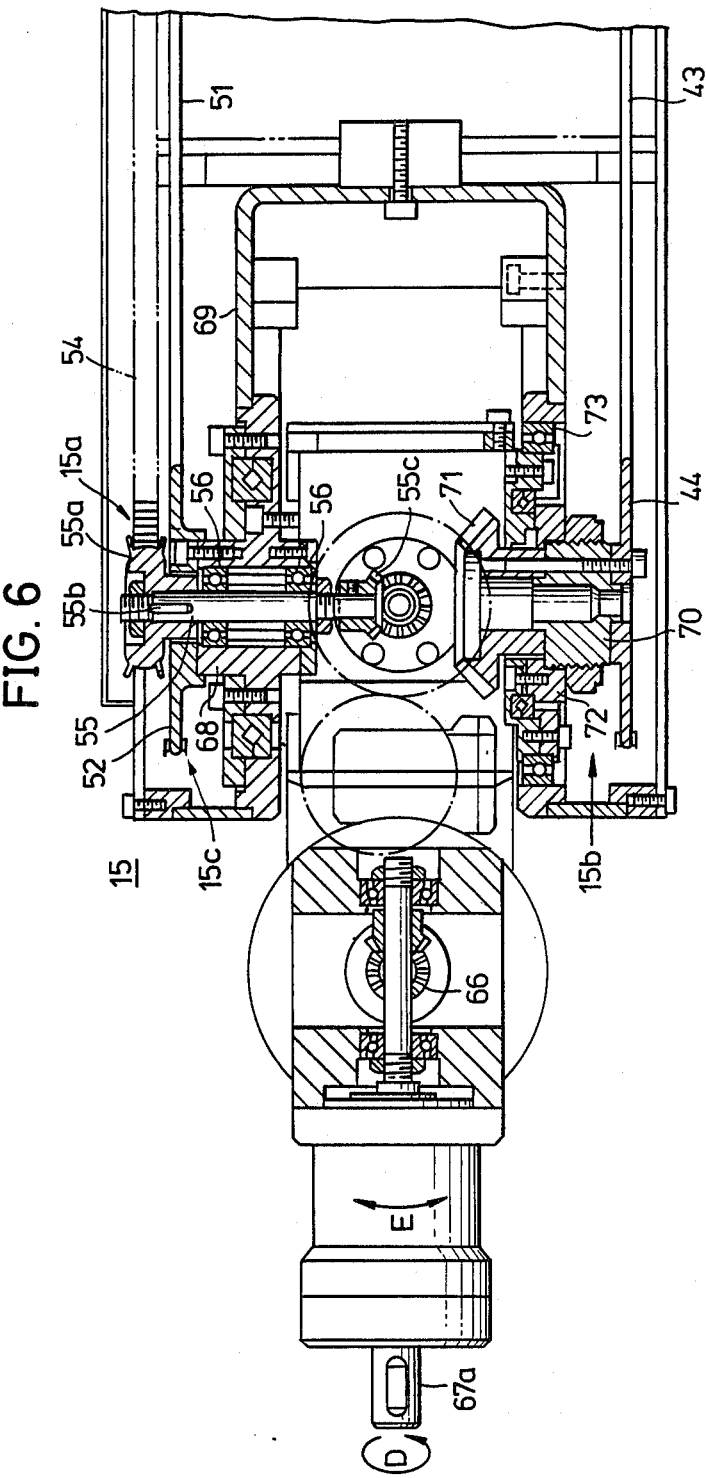
FIG. 6 is a horizontal cross sectional view showing the wrist mechanism.
Figure 7:
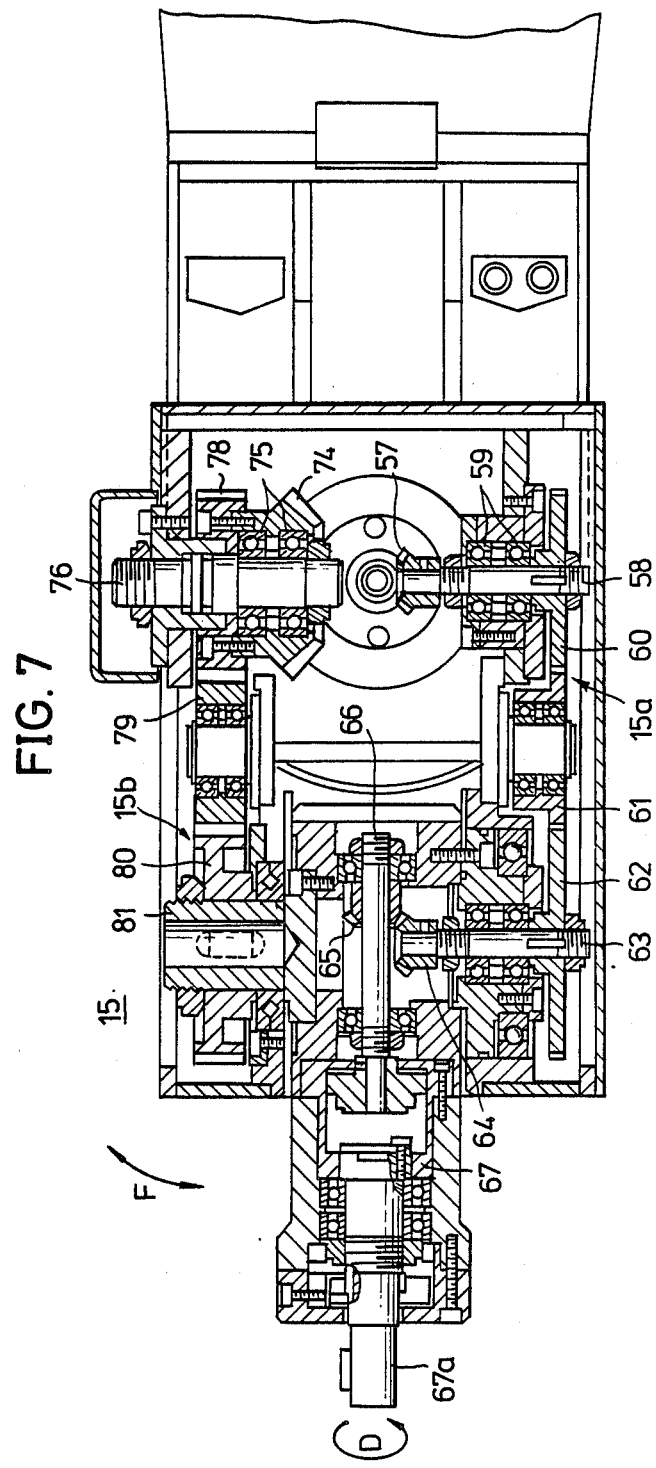
FIG. 7 is a vertical cross sectional view showing the wrist mechanism.

FIGS. 6 and 7 show the wrist mechanism 15. The wrist mechanism 15 comprises a wrist rotating shaft driving mechanism 15a for rotating the spray gun 19 in the direction D, a right-left turning shaft driving mechanism 15b for rotating the spray gun 19 in the direction E, and up-down turning shaft driving mechanism 15c for rotating the spray gun 19 in the direction F.

First, a description will be given on the wrist rotating shaft driving mechanism 15a. In FIGS. 5 and 6, the rotational driving force of the motor 53 is transmitted to a rotary shaft 55 through a timing belt 54 and a pulley 55a. The pulley 55a engages one end of the rotary shaft 55 through a key 55b, and a bevel gear 55c engages the other end of the rotary shaft 55. The rotary shaft 55 is supported on a bearing 56.

In FIG. 7, a bevel gear 57 engages the bevel gear 55c, and the rotational driving force is transmitted to a rotary shaft 58 which is perpendicular to the rotary shaft 55. The rotary shaft 58 is supported on a bearing 59, and a gear 60 is mounted on an end of the rotary shaft 58.

The rotation of the gear 60 is transmitted to a shaft 67a which is mounted with the spray gun 19, through gears 61 and 62, a rotary shaft 63, bevel gears 64 and 65, a rotary shaft 66 and a harmonic drive 67. The rotational driving force of the motor 57 is transmitted through the transmitting members described above, and the spray gun 19 is rotated in the direction D.

The up-down turning shaft driving mechanism 15c comprises the sprocket 52, a holding member 68 to which the sprocket 52 is fixed and which holds the bearing 59, and a base 69 to which the holding member 68 is fixed. Accordingly, when the rotational driving force of the motor 21 is transmitted to the sprocket 52 through the transmitting mechanism 37 including the chain 51, the wrist mechanism 15 turns up and down in the direction F about the holding member 68.

The right-left turning shaft driving mechanism 15b is operated when the rotational driving force of the motor 20 is transmitted to the sprocket 44 through the transmitting mechanism 36. The sprocket 44 is fixed on an end of a shaft 70, and a bevel gear 71 is fixed on the other end of the shaft 70. A holding member 72 is supported on a bearing 73 and is rotatable with respect to the base 69.

In FIG. 7, a bevel gear 74 is supported on a shaft 76 through a bearing 75, and meshes the bevel gear 71 in the direction perpendicular to the shaft 76. A gear 77 is unitarily fixed on the bevel gear 74, and the rotational driving force of the bevel gear 74 is transmitted to a shaft 81 through gears 78, 79 and 80. Thus, the rotational driving force of the motor 20 is transmitted to the wrist mechanism 15 through the transmitting members described above, and the wrist mechanism 15 turns right and left in the direction E about the shaft 81.

Since the motors 20 and 21 for driving the wrist mechanism 15 are provided on the rear part 13a at the intermediate portion of the support beam 13, the lengths of the transmitting paths of the transmitting mechanisms 36 and 37 are short compared to the case where the motors for driving the wrist mechanism are located on the lower part of the support beam. As a result, the construction of the transmitting mechanisms 36 and 37 is simplified by the shortened transmitting paths.

Figure 9:
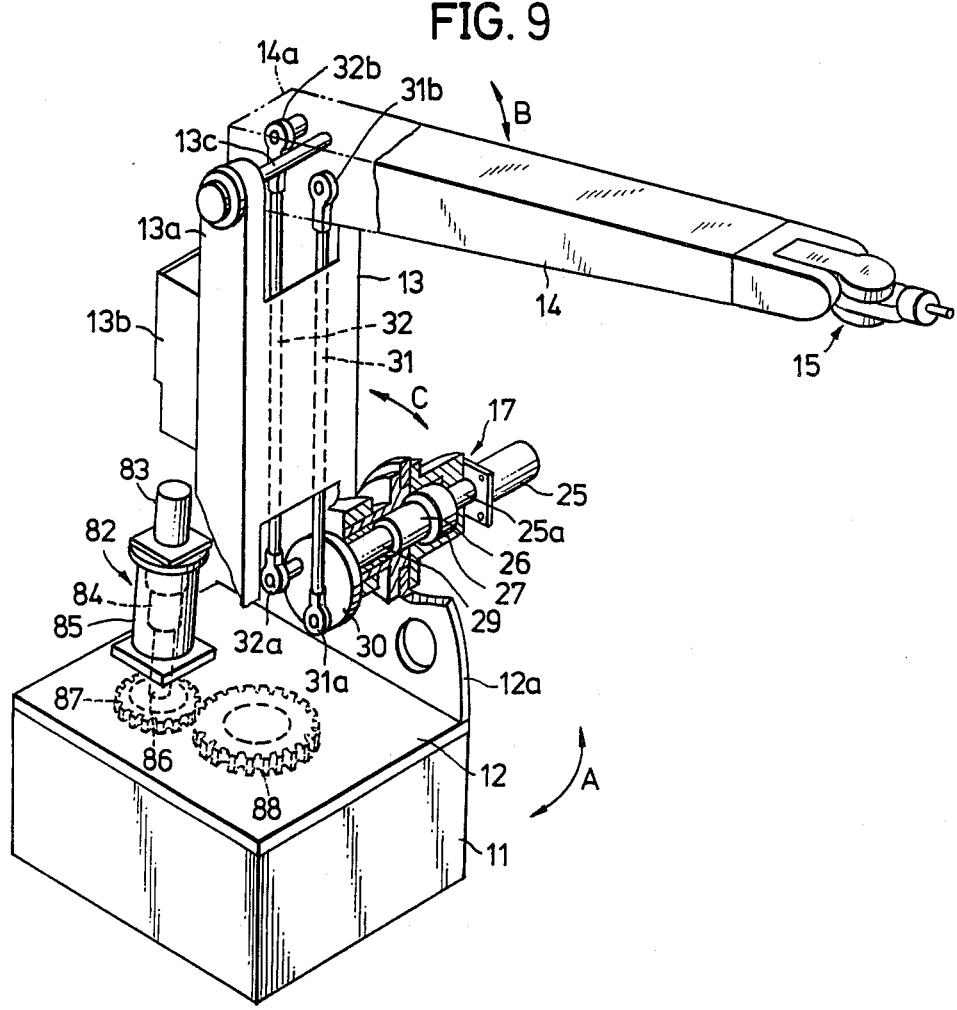

Next, a description will be given on a second embodiment of the electrical robot according to the present invention, by referring to FIGS. 8 and 9. In FIGS. 8 and 9, those parts which are the same as those corresponding parts in FIGS. 1 through 7 are designated by the same reference numerals, and a description thereof will be omitted.

In FIGS. 8 and 9, a motor unit 82 for rotating the arm 14 is provided on the rotary base 12. The motor unit 82 stands in the rear of the support beam 13, and comprises a motor 83, a harmonic drive 84 indicated by phantom lines in FIG. 9 and a cover box 85 for accommodating the harmonic drive 84. An output shaft 86 of the harmonic drive 85 penetrates the rotary base 12 and extends below the upper surface of the rotary base 12. A gear 87 indicated by phantom lines in FIG. 9 is fixed on a lower end of the output shaft 86. The gear 87 is fixed on the base 11 and meshes a large diameter gear 88 which is interposed between the base 11 and the rotary base 12.

The rotational driving force of the motor 83 is transmitted to the gear 87 after being reduced by the harmonic drive 84. Hence, the rotary base 12 rotates in the direction A as the gear 87 is rotated by the motor 83, and turns the arm 14. According to the present embodiment, it is easy to check and repair the motor 83, the harmonic drive 84 and the like of the motor unit 82 because the motor unit 82 is provided on the rotary base 12, and the maintenance of the electrical robot is facilitated. In addition, since the motor unit 82 is provided in the rear of the support beam 13, the motor unit 82 will not interfere with the rotary movement of the support beam 13.

The present invention is not limited to a painting robot of the embodiments, and is applicable to any articulated electrical robot for carrying out a desired task. In addition, the degree of freedom of motion of the wrist mechanism is not limited to three.

Further, the present invention is not limited to these embodiments, but various variations and modifications may be made without departing from the scope of the present invention.

What is claimed is:
1. An electrical robot comprising:
   a base;
   a rotary base rotatably provided on said base;
   a support beam provided on said rotary base and free to turn about a base end of said support beam;
   an arm supported on a distal end of said support beam and free to turn about a base end of said arm;
   a wrist mechanism provided on a distal end of said arm and having at least one degree of freedom of motion;
   a transmitting mechanism for transmitting a driving force to said wrist mechanism; and
   driving means including at least one motor for driving said wrist mechanism through said transmitting mechanism,
   said transmitting mechanism having at least one reduction gear for reducing a driving force transmitted to said wrist mechanism,
   said driving means and said reduction gear being mounted sideways at an intermediate portion on a rear part of said support beam .

2. An electrical robot as claimed in claim 1 in which said wrist mechanism has at least two degrees of freedom of motion, and said driving means comprises a plurality of motors for driving said wrist mechanism in mutually different directions through said transmitting mechanism.

3. An electrical robot as claimed in claim 1 in which said wrist mechanism has at least two degrees of freedom of motion, said driving means comprises a plurality of motors for driving said wrist mechanism in mutually different directions through said transmitting mechanism, said transmitting mechanism comprises reduction gears for reducing driving forces transmitted to said wrist mechanism, and said motors and said reduction gears are aligned vertically and arranged on said support beam.

4. An electrical robot as claimed in claim 1 which further comprises a driving motor for driving said arm provided on an upper surface of said rotary base.

5. An electrical robot as claimed in claim 4 in which said driving motor is located rearwardly of said support beam.

* * * * *